(12) United States Patent
Jung et al.

(10) Patent No.: US 10,382,725 B2
(45) Date of Patent: Aug. 13, 2019

(54) CAMERA FOR INDOOR/OUTDOOR USE

(71) Applicant: Hanwha Techwin Co., Ltd., Changwon-si (KR)

(72) Inventors: Sung Chan Jung, Changwon-si (KR); Ji Hwan Bae, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 15/714,055

(22) Filed: Sep. 25, 2017

(65) Prior Publication Data

US 2018/0091775 A1    Mar. 29, 2018

(30) Foreign Application Priority Data

Sep. 26, 2016    (KR) .................... 10-2016-0122959

(51) Int. Cl.
*H04N 7/18* (2006.01)
*H04N 5/225* (2006.01)
(Continued)

(52) U.S. Cl.
CPC .............. *H04N 7/18* (2013.01); *G03B 17/02* (2013.01); *G03B 17/08* (2013.01);
(Continued)

(58) Field of Classification Search
CPC ...... H04N 7/18; H04N 5/2253; H04N 5/2252; H04N 7/183; H04N 5/225;
(Continued)

(56) References Cited

U.S. PATENT DOCUMENTS 5,946,404 A * 8/1999 Bakshi ............ G08B 13/19619
16/383
6,147,701 A * 11/2000 Tamura ................ F16M 11/10
348/143
(Continued)

FOREIGN PATENT DOCUMENTS

EP        2950517 A1    12/2015
KR    101260258 B1    5/2013
(Continued)

OTHER PUBLICATIONS

Communication dated Feb. 21, 2018, issued by the European Patent Office in counterpart European Patent Application No. 17192811.2.

*Primary Examiner* — Albert H Cutler
(74) *Attorney, Agent, or Firm* — Sughrue Mion, PLLC

(57) ABSTRACT

Provided is a camera used both outdoors and indoors and including a camera assembly, which is an indoor camera, a camera external package coupled to the indoor camera, and an outdoor camera, which is a camera used outdoors. The outdoor camera is formed by coupling the camera assembly and the camera external package. It is possible to extend functions of the camera assembly by coupling the camera assembly and the camera external package. Functions of using power over Ethernet (PoE) power, adding a video analytics (VA) function, being used outdoors, and the like are examples of such extended functions. Since the outdoor camera is provided with a configuration for coupling the camera assembly and the camera external package, it is unnecessary to separately provide a camera used indoors and a camera used outdoors. Also, it is possible to maintain a small size of the camera assembly adequate for being used both indoors and outdoors.

10 Claims, 14 Drawing Sheets

(51) Int. Cl.
- *H01R 13/04* (2006.01)
- *G03B 17/02* (2006.01)
- *H01R 13/52* (2006.01)
- *G03B 17/08* (2006.01)
- *G08B 13/196* (2006.01)

(52) U.S. Cl.
CPC ....... *G08B 13/19619* (2013.01); *H01R 13/04* (2013.01); *H01R 13/52* (2013.01); *H04N 5/225* (2013.01); *H04N 5/2252* (2013.01); *H04N 5/2253* (2013.01); *H04N 7/183* (2013.01)

(58) Field of Classification Search
CPC .. G08B 13/19619; H01R 13/52; H01R 13/04; G03B 17/08; G03B 17/02
USPC .................................................. 348/373, 374
See application file for complete search history.

(56) References Cited

U.S. PATENT DOCUMENTS

| | | | |
|---|---|---|---|
| 8,120,656 B2* | 2/2012 | Hwang | H04N 5/247 348/133 |
| 2003/0194230 A1* | 10/2003 | Tamura | G08B 13/1963 396/427 |
| 2006/0163481 A1* | 7/2006 | Huang | G08B 13/19619 250/330 |
| 2008/0055409 A1 | 3/2008 | Mars et al. | |
| 2010/0128455 A1* | 5/2010 | Ophoven | H04N 5/2252 361/818 |
| 2010/0272427 A1* | 10/2010 | Jung | G03B 17/00 396/427 |
| 2012/0008935 A1* | 1/2012 | Cheng | G03B 17/02 396/535 |
| 2013/0128104 A1* | 5/2013 | Nunnink | G03B 15/05 348/373 |
| 2015/0085182 A1* | 3/2015 | Jones | H04N 5/2254 348/374 |
| 2015/0273799 A1* | 10/2015 | Takama | H04N 5/2257 348/373 |
| 2016/0014317 A1 | 1/2016 | Yoshino et al. | |
| 2016/0112607 A1* | 4/2016 | Yang | H04N 5/2252 348/373 |
| 2016/0127643 A1 | 5/2016 | Huerta et al. | |
| 2016/0174408 A1* | 6/2016 | Tolbert | H05K 1/0209 348/373 |
| 2017/0104951 A1* | 4/2017 | Wada | H02J 50/10 |
| 2017/0272625 A1* | 9/2017 | Gravis | G08B 13/19619 |
| 2018/0227473 A1* | 8/2018 | Chen | H04N 5/2256 |

FOREIGN PATENT DOCUMENTS

| | | |
|---|---|---|
| KR | 101622254 B1 | 5/2016 |
| KR | 101626371 B1 | 6/2016 |
| WO | 2006/012524 A2 | 2/2006 |

\* cited by examiner

CAMERA FOR INDOOR/OUTDOOR USE

CROSS-REFERENCE TO THE RELATED APPLICATION

This application claims priority from Korean Patent Application No. 10-2016-0122959 filed on Sep. 26, 2016 in the Korean Intellectual Property Office, the disclosure of which is incorporated herein by reference in its entirety.

BACKGROUND

1. Field

Apparatuses consistent with exemplary embodiments of the inventive concept relate to a camera for indoor/outdoor use, and more particularly, to a camera which is usable outdoors when an indoor camera is coupled to an external package.

2. Description of the Related Art

Generally, monitoring systems are widely used in various places including banks, department stores, and general residential areas. Such monitoring systems may be used for crime prevention and security, but also have recently been used for real-time monitoring of pets or children indoors. Also, a system most generally used as one of such monitoring systems is a closed circuit television (CCTV) system in which a camera is installed at an adequate position to capture an area to be monitored to allow a user to monitor images captured by the camera.

The camera used in the monitoring system may be installed indoors or outdoors depending on a purpose of monitoring and an area to be monitored. The camera operates in a relatively stable environment when used indoors. However, the camera must endure rain, wind, relatively great temperature changes, external shocks, and the like to smoothly operate outdoors. Accordingly, in the case in which a camera is installed outdoors, an outdoor monitoring camera is configured to include an additional housing surrounding and protecting contents thereof from external factors in addition to basic components which form the camera.

There is an additional difference between a case in which a camera of a monitoring system is installed indoors and a case in which the camera is installed outdoors. When the camera is installed indoors, an apparatus for monitoring images captured by the camera and a plug for supplying power are not excessively spaced apart from the camera. Accordingly, images may be transmitted and received through wireless communication using a WiFi module and the like instead of through wired communication, and there is no difficulty in supplying power through a direct current (DC) adapter and cable. On the other hand, when the camera is installed outdoors, since the camera is spaced far away from a monitoring apparatus, wireless communication is not sufficient for transmission and reception of images, and an elongated cable is necessary for supplying power.

Since indoor cameras and outdoors cameras have different configurations due to the above-described restrictions and differences in conditions, it is inconvenient to separately buy and use indoor cameras and outdoor cameras. Accordingly, the inventive concept provides a camera selectively usable indoors or outdoors.

SUMMARY

The exemplary embodiments of the inventive concept provide a single camera capable of being used indoors and outdoors.

The exemplary embodiments of the inventive concept also provide a camera capable of being used outdoors without restrictions in length of a power cable and a data transmission/reception range.

The inventive concept is not limited to the exemplary embodiments and other embodiments may also be possibly achieved by those skilled in the art from the following description.

According to the exemplary embodiments, there is provided a camera assembly which is couplable to and separable from a camera external package and includes an extended function when coupled to the camera external package. The camera assembly may include an image sensor configured to obtain an image of an object captured through a lens, an image signal processor configured to process the obtained image of the object, a circuit board on which the image sensor and the image signal processor are mounted, a camera case configured to accommodate the image sensor, the image signal processor, and the circuit board, and an intermediate connector formed on one side of the camera case to be electrically connected to the circuit board and electrically coupled to the camera external package when the camera external package and the camera assembly are coupled, to receive power through the camera external package, supply the received power to the circuit board, and transmit and receive data to and from the circuit board.

According to the exemplary embodiments, there is provided a camera external package which is couplable to and separated from a camera assembly and to provide an extension of functions of the camera assembly when coupled to the camera assembly. The camera external package may include a cable junction to which a cable extended from the outside is connectable, a network board electrically connected to the cable junction, and configured to receive power and transmit and receive data to and from the outside through the cable junction, a housing configured to accommodate the network board, and a junction connector electrically connected to the network board and coupled to an intermediate connector formed at the camera assembly to supply the power to the camera assembly and transmit and receive the data to and from the camera assembly when the camera assembly and the camera external package are coupled.

According to the exemplary embodiments, there is provided an outdoor camera includes an indoor camera and a camera external package couplable to and separable from the indoor camera and configured to provide extended functions when coupled to the indoor camera. Here, the indoor camera may include an image sensor configured to obtain an image of an object captured through a lens, an image signal processor configured to process the obtained image of the object, a circuit board on which the image sensor and the image signal processor are mounted, a camera case configured to accommodate the image sensor, the image signal processor, and the circuit board, and an intermediate connector formed on one side of the camera case to be electrically connected to the circuit board. Also, the camera external package may include a cable junction to which a cable extended from the outside is connectable, a network board electrically connected to the cable junction and configured to receive power and transmit and receive data to and from the outside through the cable junction, and a junction connector electrically connected to the network board and coupled to the intermediate connector to supply the power to the indoor camera and transmit/receive the data with the indoor camera when the indoor camera and the camera external package are coupled.

Other details of the inventive concept will be included in the following detailed description and drawings.

BRIEF DESCRIPTION OF THE DRAWINGS

The above and other aspects and features of the inventive concept will become more apparent by describing exemplary embodiments thereof in detail with reference to the attached drawings, in which.

DETAILED DESCRIPTION OF THE EXEMPLARY EMBODIMENTS

Figure 1:
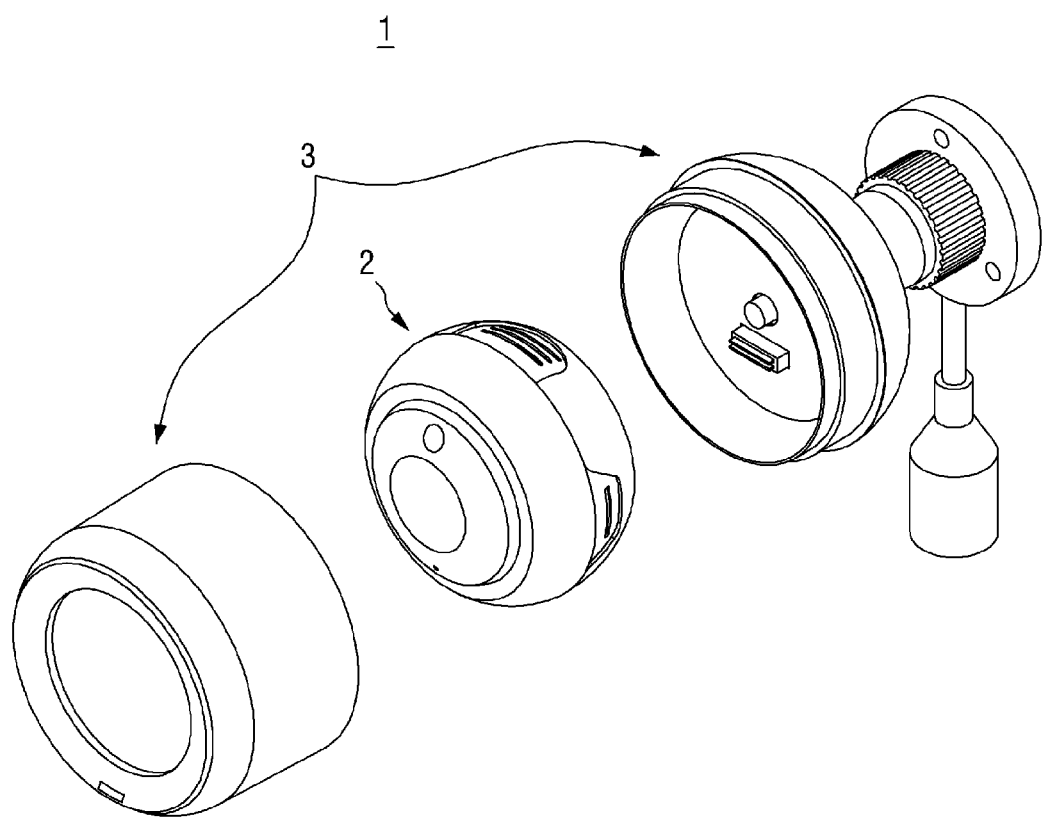
FIG. 1 is a perspective view illustrating an entire configuration of an outdoor camera according to an exemplary embodiment.

Advantages and features of the inventive concept and a method of achieving the same will become apparent with reference to the attached drawings and exemplary embodiments described below in detail. However, the inventive concept is not limited to the exemplary embodiments described below, and may be embodied with various different modifications. The exemplary embodiments are merely provided to allow one of ordinary skill in the art to completely understand the scope of the inventive concept and are defined by the scope of the claims. Throughout the specification, like reference numerals refer to like elements.

Unless defined otherwise, all terms (including technical and scientific terms) used herein may be understood as having meanings commonly understandable by one of ordinary skill in the art. Also, the terms defined in generally used dictionaries, unless clearly and particularly defined otherwise, should not be ideally or excessively understood.

The terms used herein are for explaining the exemplary embodiments but are not intended to limit the inventive concept. Throughout the specification, unless particularly defined otherwise, singular forms include plural forms. "Comprises" and/or "comprising," when used herein, does not preclude the presence or addition of one or more elements in addition to stated elements.

Hereinafter, the exemplary embodiments will be described in detail with reference to the attached drawings.

FIG. 1 is a perspective view illustrating an entire configuration of an outdoor camera 1 according to an exemplary embodiment. The outdoor camera 1 includes a camera assembly 2 and a camera external package 3. The complete outdoor camera 1 may be configured by coupling the camera assembly 2 and the camera external package 3.

The camera assembly 2 refers to a monitoring camera apparatus that can be installed and used indoors. The camera assembly 2 has specifications sufficient for being used indoors, and may be smaller than a camera used outdoors.

The camera assembly 2 may be a general box type camera, but is not limited thereto, and may be a pan-tilt-zoom (PTZ) camera, a fisheye camera, a zoom camera, and the like.

The camera external package 3 is a component corresponding to an external housing of a camera used outdoors, and may be formed of a material having corrosion resistance and greater shock resistance than that of the camera assembly 2 to safely protect a camera from external factors to normally operate even when the camera is used outdoors. Also, the camera external package 3 may be formed of a waterproofing material for a case in which the camera external package 3 is exposed to stormy weather or a damp environment, but is not limited thereto.

Since the camera external package 3 is coupled to the camera assembly 2, and protects the camera assembly 2 from external factors, an internal shape thereof may be formed corresponding to an external shape of the camera assembly 2. An internal structure of the camera external package 3 may be formed to precisely correspond to the external shape of the camera assembly 2 to allow an inner surface thereof to come into contact with and protect the camera assembly 2, but may further include a buffering structure to reduce a transfer of a shock transferred to the camera external package 3 to the camera assembly 2. For example, a honeycomb structure of a hexagonal prism, a truss structure, and the like may be formed on the inner surface of the camera external package 3. However, the buffering structure is not limited thereto.

Also, the camera external package 3 is shown as being divided into two parts in FIG. 1, but is not limited thereto, and may be integrated to allow the camera assembly 2 to be inserted therein.

Since it is necessary for the camera external package 3 to be coupled to the camera assembly 2 for monitoring, which is a purpose of a monitoring camera apparatus, to be performed, a lens area or an infrared (IR) area corresponding to an image pickup portion should not be covered when the camera external package 3 is coupled to the camera assembly 2. Accordingly, a corresponding portion should be configured to be an open shape or may be formed of a transparent material which transmits light.

The structure of the outdoor camera according to an exemplary embodiment has been schematically described with reference to FIG. 1. Hereinafter, a structure of the camera assembly will be described in detail with reference to FIGS. 2 to 6, and a structure of the camera external package will be described in detail with reference to FIGS. 7 to 11.

Figure 2:
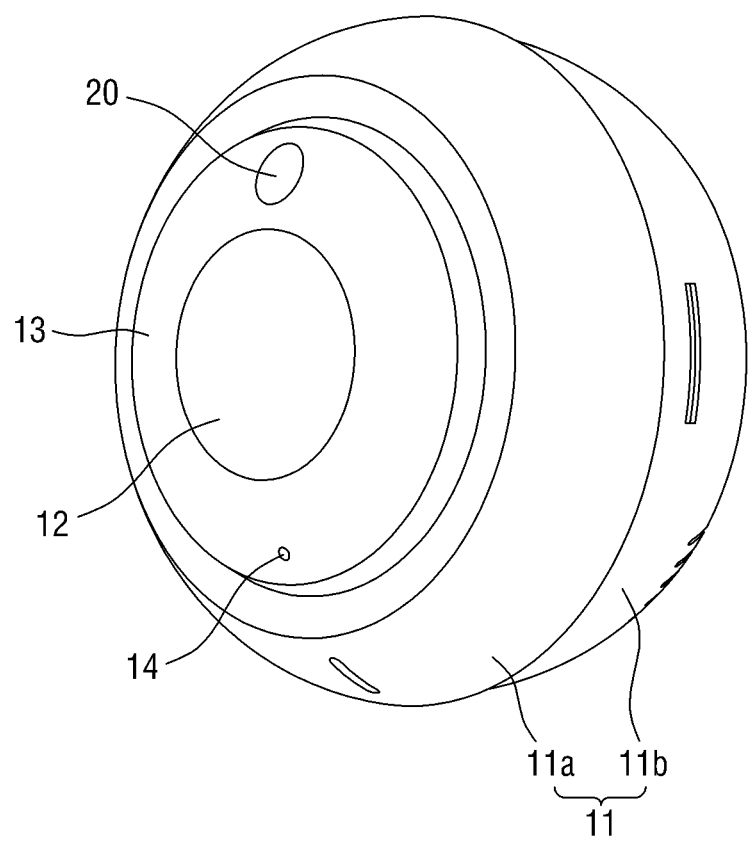
FIGS. 2, 4, and 6 are perspective views of a camera assembly, according to exemplary embodiments.

FIG. 2 is a perspective view of a camera assembly, according to an exemplary embodiment. The camera assembly illustrated in FIG. 2 may be the camera assembly 2 of FIG. 1. FIG. 2 illustrates a camera case 11 of the camera assembly, according to an exemplary embodiment.

The camera case 11 may include a first case 11a and a second case 11b. The first case 11a and the second case 11b may be coupled and assembled with each other to accommodate internal components of the camera assembly. The camera case 11 may be formed in a shape shown in FIG. 1 as well as various other shapes capable of accommodating internal components. For example, the camera case 11 may be integrated.

Figure 3:
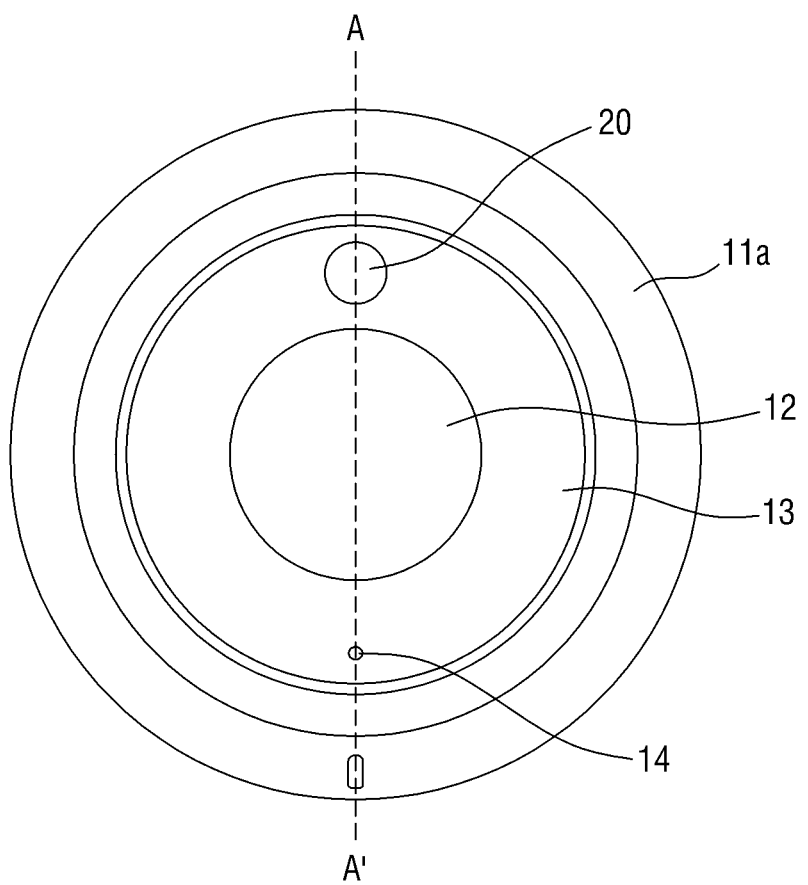
FIG. 3 is a front view of a camera assembly, according to an exemplary embodiment.

FIG. 3 is a front view of a camera assembly, according to an exemplary embodiment. The camera assembly illustrated in FIG. 3 may be the camera assembly of FIG. 2. In FIG. 3, the first case 11a is illustrated as being coupled to a front of the second case 11b which is not shown in this drawing. The first case 11a includes a lens cover 12, an IR cover 13, an illumination sensor 20, and a microphone 14.

The lens cover 12 performs a function of protecting a lens among internal components of the camera assembly. When the camera is used indoors, the lens cover 12 may not be an essential component. However, since the camera assembly according to the exemplary embodiment is configured to be coupled to a camera external package to be usable outdoors, the lens cover 12 may be configured to be integrated with the first case 11a to be easily coupled to the camera external package. However, the lens cover 12 is not limited to being integrated with the first case 11a, and may be integrated with the camera external package to protect the lens.

The lens cover 12 may be formed of a transparent material which transmits light to simultaneously protect the lens from external factors and receive light for a purpose of the lens.

The IR cover 13 transmits IR-area light emitted from an IR light emitting diode (LED) among internal components of the camera assembly. Since it is necessary for light to return from an object in a direction in which the lens of the camera assembly faces, the IR cover 13 may be positioned in the same direction as that of the lens cover 12, and may be formed of a transparent material which transmits IR-area light.

The illumination sensor 20 is a sensor which measures brightness of light in a monitored area. It is determined whether an image of an object may be sufficiently captured through visible light by using the brightness of the monitored area measured by the illumination sensor 20. When the brightness measured by the illumination sensor 20 is at or below a particular value, it is possible to capture image of the object even in a dark situation by capturing the image of the object by using light of the IR LED among internal components of the camera assembly.

The first case 11a may include the microphone 14. The monitoring function of the camera assembly may be further strengthened through a recording function of the microphone 14. When video is captured by the lens of the camera assembly and audio is collected by the microphone 14, a user may monitor a monitored place in real time.

Figure 4:
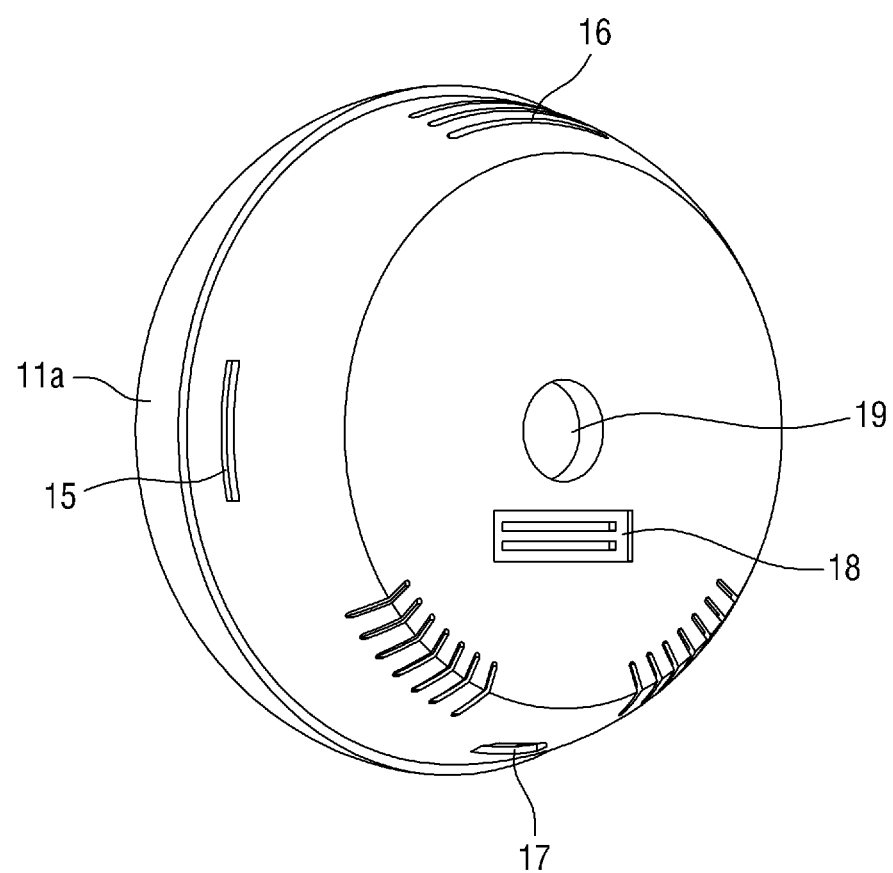

FIG. 4 is a perspective view of a camera assembly, according to an exemplary embodiment. The camera assembly illustrated in FIG. 4 may be the camera assembly of FIG. 3. In FIG. 4, the first case 11a and the second case 11b coupled to a rear of the first case 11a are illustrated. The second case 11b will be described in detail with reference to FIG. 4.

The second case 11b may include a mounting slot 15, a vent 16, a power jack 17, an intermediate connector 18, and an insert 19. Here, the mounting slot 15, the vent 16, and the power jack 17 may be provided at a side of the second case 11b, and the intermediate connector 18 and the insert 19 may be provided at a rear surface of the second case 11b.

The mounting slot 15 is a slot to or from which a storage medium for storing images processed by an image signal processor among internal components of the camera assembly is attachable or detachable. The storage medium may be a secure digital (SD) card. A method of inserting or separating the SD card into or from the mounting slot may be used as an attachment/detachment method.

The vent 16 performs a function of discharging heat generated by internal components of the camera assembly such as a circuit board and the like. At least one hole may be formed at the side of the second case 11b to form the vent 16. The vent 16 may be formed by forming a hole at the rear surface of the second case 11b as necessary.

The power jack 17, the intermediate connector 18, and the insert 19 are components used to connect the camera assembly and an external device. The power jack 17 is used for connecting the camera assembly to a direct current (DC) cable, and the intermediate connector 18 and the insert 19 are used for connecting the camera assembly to the camera external package. The second case 11b may include a plurality of holes having shapes corresponding to shapes of the power jack 17, the intermediate connector 18, and the insert 19, respectively. The power jack 17, the intermediate connector 18, and the insert 19 may be exposed to the outside through the plurality of holes.

It is not necessary for the mounting slot 15, the vent 16, and the power jack 17 to be located at the side of the second case 11b. Also, it is not necessary for the intermediate connector 18 and the insert 19 to be located at the rear surface. The mounting slot 15, the vent 16, the power jack 17, the intermediate connector 18, and the insert 19 may be provided at other positions of the second case 11b as necessary. For example, in a case in which the storage medium is attached to or detached from the rear surface of the camera assembly, the mounting slot 15 may be provided at the rear surface of the second case.

Figure 5:
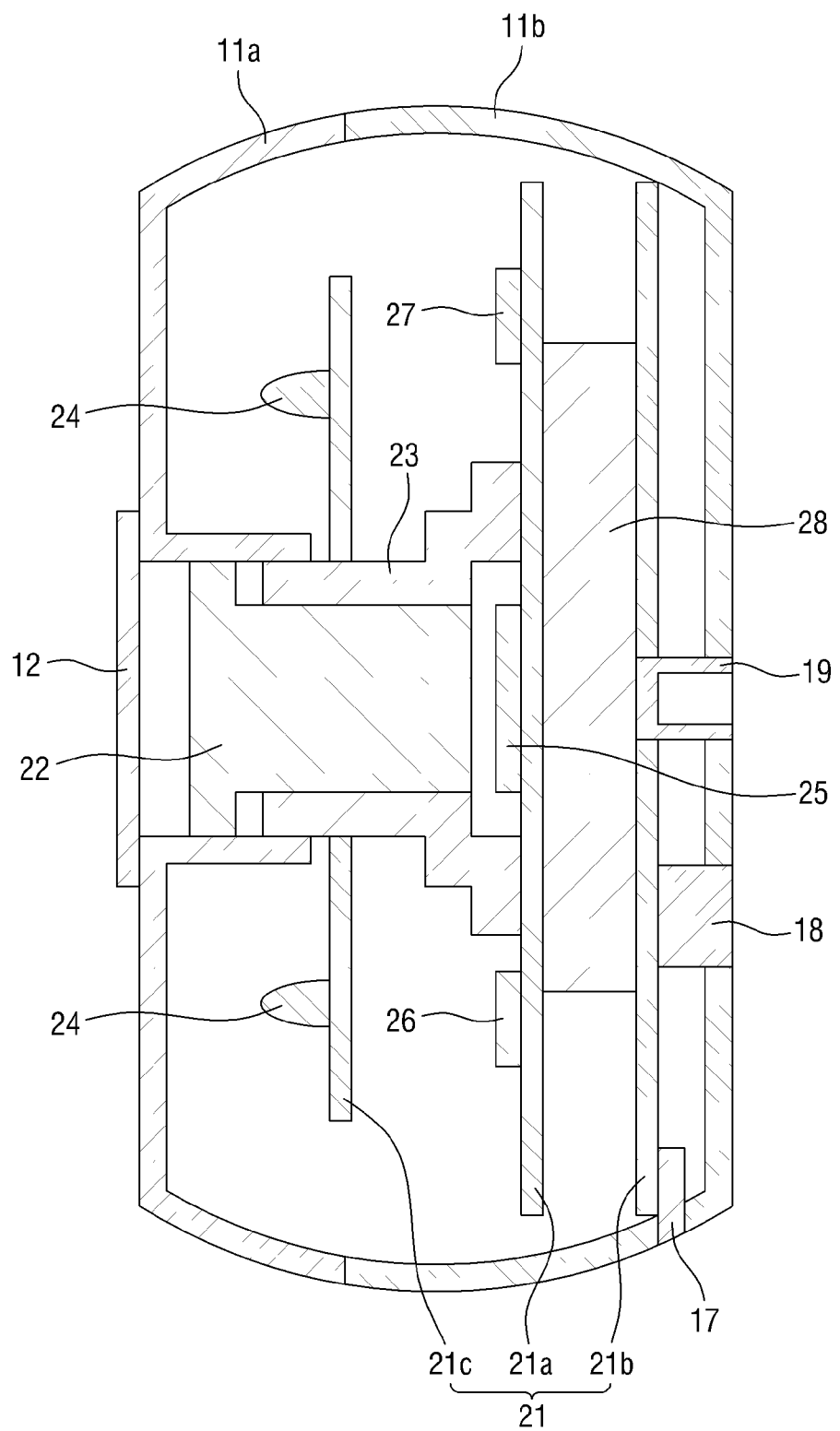
FIG. 5 is a cross-sectional view of a camera assembly, according to an exemplary embodiment.

FIG. 5 is a cross-sectional view of a camera assembly, according to an exemplary embodiment. The camera assembly illustrated in FIG. 5 may the camera assembly of FIG. 3. FIG. 5 is a cross-sectional view of the camera assembly taken along a cutting line A-A' in FIG. 3.

The camera assembly may include the first case 11a, the second case 11b, a circuit board 21, a lens 22, a lens holder 23, an IR light emitting diode (LED) 24, an image sensor 25, an image signal processor 26, a network portion 27, the power jack 17, the intermediate connector 18, a heat sink 28, and the insert 19. Since the first case 11a and the second case 11b have been described with reference to FIGS. 2 to 4, other components of the camera assembly will be described below.

The circuit board 21 of the camera assembly may include a main board 21a, a power board 21b, and an IR board 21c. When the circuit board 21 is formed as a single board, a size of the camera assembly may be significantly increased depending on a size of the board. Accordingly, in the exemplary embodiment, the circuit board 21 includes a plurality of boards in consideration of the size of the camera assembly. However, components of the circuit board 21 may be formed differently from components of the exemplary embodiment as necessary. For example, the main board 21a and the power board 21b of the circuit board 21 may be configured as a single board.

The lens 22 is fixed to the main board 21a by the lens holder 23, and the image sensor 25, the image signal processor 26, and the network portion 27 may be mounted on the main board 21a.

The lens 22 performs functions of receiving light diffused or reflected from an object and focusing an image to allow the image sensor 25 to use the image. Accordingly, the lens 22 may be formed of a transparent material, and may have a focal distance capable of focusing the image on the image sensor 25. The lens 22 may be formed of a unifocal lens but may be formed of a zoom lens or a fisheye lens having a wide angle of view. Also, the lens 22 may include an additional optical filter such as a day/night (D/N) filter and the like.

The lens holder 23 fixed to the main board 21a surrounds and supports the lens 22 to fix the lens 22 to the main board 21a.

The IR board 21c includes a hole which passes through the lens holder 23 to allow the lens holder 23 to be inserted into and mounted in the hole. The IR LED 24 may be mounted on the IR board 21c. The IR board 21c may be electrically connected to the power board 21b, and supplies power to the IR LED 24.

The IR LED 24 is mounted on the IR board 21c, and emits IR-area light with a short wavelength toward a front of the camera assembly. When the IR-area light emitted from the IR LED 24 is reflected by an object and returns, the IR-area light may be transmitted to the image sensor 25 by the lens 22. The IR board 21c is electrically connected to the power board 21b, and supplies power to the IR LED 24.

The function of the camera assembly may be extended by the IR LED 24. When it is difficult to monitor an object through visible light due to an insufficient external light source, it is possible to monitor the object through IR light using the IR LED 24. In this case, the IR LED 24 may be activated only when an illuminance value at or below a particular value is sensed by the illumination sensor 20 located on a front surface of the camera cover.

Also, optionally, an IR image may be obtained by using the IR LED 24, and a visible light image may be obtained only when a particular event occurs. For example, when a movement of an object which generates heat is monitored, an IR image may be obtained. Then, when a movement of the object occurs in the IR image as a particular event, a visible light image may be obtained to capture more detailed images of a shape and the movement of the object.

When light is concentrated and focused through the lens 22 as an image, the image sensor 25 generates a signal which varies according to a wavelength of the light therefrom, and converts information on the image into an electrical signal. Accordingly, an image of the object is obtained. The image sensor 25 may be a charged-coupled device (CCD), a complementary metal-oxide semiconductor (CMOS), and the like, but is not limited thereto.

The image signal processor 26 converts the electrical signal received from the image sensor 25 into a storable form including an encoded video. The image signal processor 26 may be a video graphic array (VGA) and the like.

The network portion 27 is used to transmit and receive an image processed by the image signal processor 26 or a control signal for the camera assembly. The network portion 27 may include a wired network module and a wireless network module. Accordingly, both wired communication and wireless communication may be possible. The wired network module may include an Ethernet card (or a network interface card (NIC)) or a chip for wired communication. The wireless network module may be formed as a 3G modem or a long term evolution (LTE) modem for wireless communication, and may use other methods such as ZigBee, wireless local area network (WLAN), Bluetooth, and the like.

The camera assembly according to the exemplary embodiment may selectively receive two types of power to supply power to the above-described components. The first power is DC power supplied through the power jack 17, and the second power is power over Ethernet (PoE) supplied through the intermediate connector 18. The camera assembly may receive the DC power through the power jack 17 to be used indoors, and may receive the PoE through the intermediate connector 18 to be used outdoors when coupled to the camera external package.

The power jack 17 is a component which functions as a connector that receives power from an external power source. The power jack 17 may be positioned to be exposed to the outside from the side of the second case 11b. Power of a power source connected to the power jack 17 may be converted from alternating current (AC) into DC through a DC adapter, but is not limited thereto. The power jack 17 receives power from the outside and transmits the power to the power board 21b electrically connected thereto.

The intermediate connector 18 is a component which functions as a connector for receiving power from the camera external package. The intermediate connector 18 may be positioned to be exposed to the outside from the rear surface of the second case 11b. The intermediate connector 18 may be electrically connected to a junction connector of the camera package when the camera assembly is coupled to the camera external package. The intermediate connector 18 does not perform a particular function of its own during operation of the camera assembly. However, when the camera assembly is coupled to the camera package, power may be supplied from the camera external package or data may be transmitted/received to/from the camera external package through the intermediate connector 18. The power supplied from the camera external package may be PoE. The intermediate connector 18 receives the power from the camera external package, and transmits the power to the power board 21b electrically connected thereto.

The power board 21b is a component that supplies power to the camera assembly. The power board 21b may be electrically connected to the power jack 17 and/or the intermediate connector 18, and may receive power from the outside. The power board 21b rectifies the supplied power, smoothes the power by using a capacitor, regulates a voltage of the power by using a voltage regulator diode, and transmits the power to allow the image sensor 25, the image signal processor 26, the network portion 27, the IR LED 24, and the like among components of the camera assembly that need power to use the power. This is because a variety of voltage specifications are usable by the components, and the power should be stably supplied to prevent a failure.

Next, the heat sink 28, which is a component that discharges heat generated in the camera assembly outward, will be described. The vent 16 (see FIG. 4) of the second case 11b is a component that discharges the heat generated in the camera assembly into the air. The heat sink 28 is a component that comes into direct contact with the circuit board 21, and transfers and emits heat outward.

The heat sink 28 is mounted to be in contact with the circuit board 21 such that heat generated by the circuit board 21 is transferred thereby. In FIG. 5, the heat sink 28 is illustrated as being in contact with both the main board 21a and the power board 21b. Optionally, the heat sink 28 may be mounted in another position different from the position shown in FIG. 5. For example, the heat sink 28 may be mounted to be in contact with a rear surface of the power board 21b. The heat sink 28 may be formed of a metal material to easily transfer heat.

Heat transferred from the circuit board 21 to the heat sink 28 may be discharged to the outside also through the insert 19 in contact with the heat sink 28. The insert 19 may be exposed at the rear surface of the second case 11b to discharge heat transferred from the heat sink 28 to the outside.

The insert 19 has a concave groove shape such that a contact member of the camera external package may be inserted into the insert 19 to couple and fix the camera assembly and the camera external package. When the camera assembly is coupled to the camera external package, the insert 19 may come into contact with the contact member formed at the camera external package and may discharge heat transferred from the heat sink 28 into the camera external package through the contact member.

When the camera assembly is not coupled to the camera external package, the insert 19 may be coupled to a bracket for fixing the camera assembly to an installation place. In this case, it is possible to discharge the heat transferred from the heat sink 28 to the outside through the bracket. Like the heat sink 28, the insert 19 may be formed of a metal material to easily transfer heat.

Figure 6:
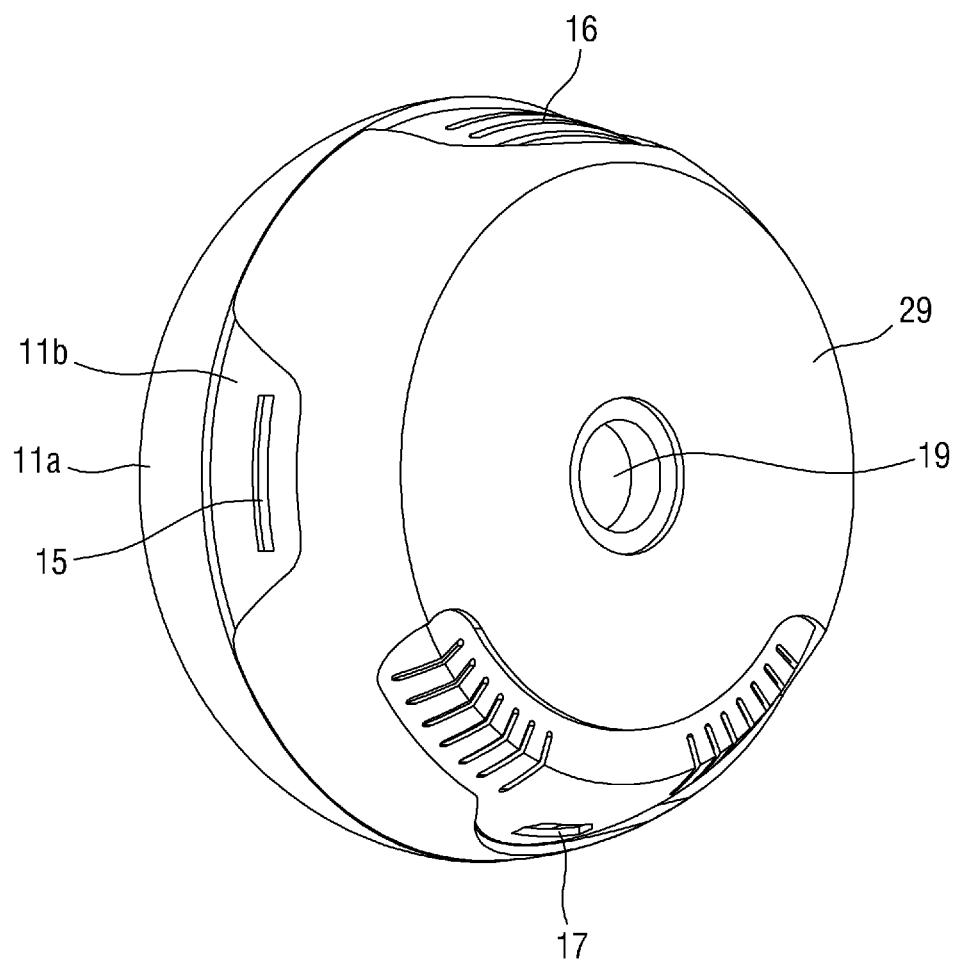

FIG. 6 is a perspective view of a camera assembly, according to an exemplary embodiment. The camera assembly of FIG. 6 may further include a rear cover 29 in addition to the first case 11a and the second case 11b as illustrated in FIG. 5.

As shown in FIG. 5, the intermediate connector has no function to perform when the camera assembly operates by itself. Accordingly, the rear cover 29 may be coupled to a rear of the camera case while closing the intermediate connector to protect the intermediate connector when the camera assembly operates by itself. The rear cover 29 may include grooves or holes formed to expose the mounting slot 15, the vent 16, the power jack 17, and the insert 19 to the outside.

Next, the camera external package coupled to the camera assembly will be described. The function of the camera assembly may be extended when coupled to the camera external package. A function of being protected from external factors by the camera external package to be usable outdoors, a function of receiving PoE through the camera external package, a video analytics (VA) function added to a basic camera function of the camera assembly, and the like are examples of such extended functions. The camera external package which extends the function of the camera assembly will be described with reference to FIGS. 7 to 11.

Figure 7:
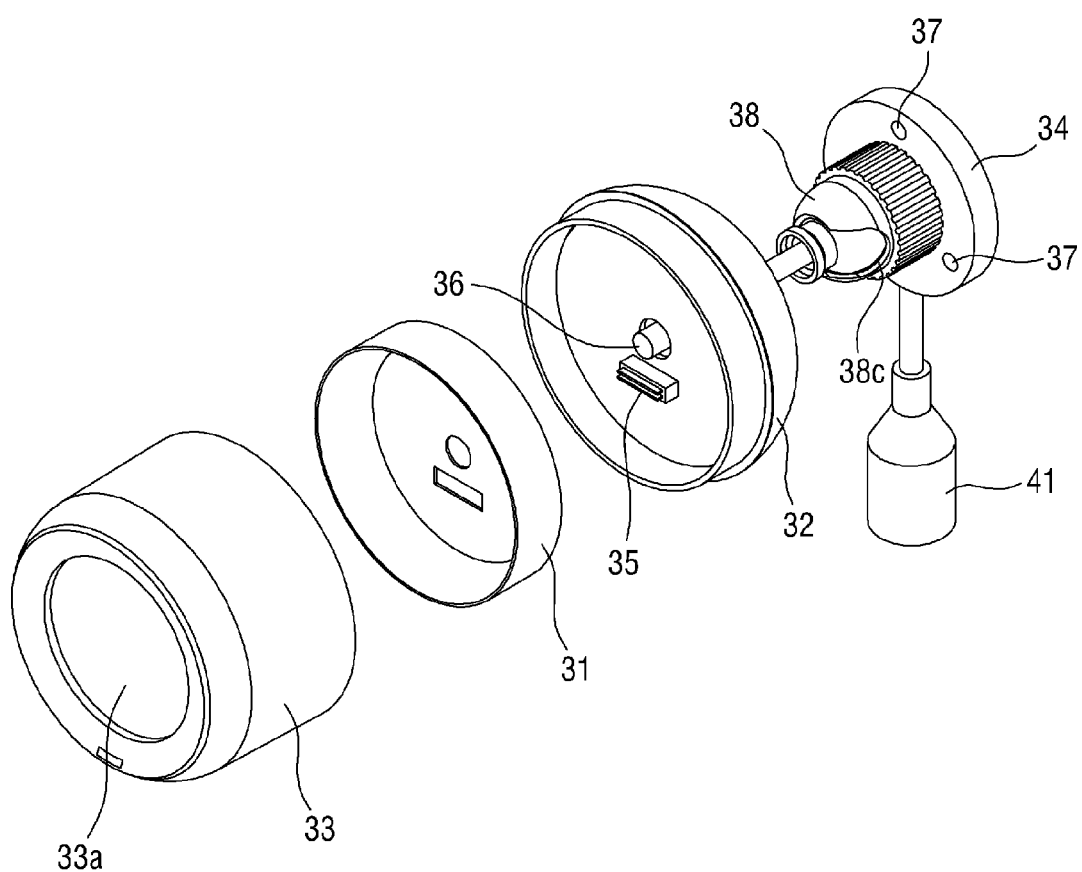
FIG. 7 is an exploded perspective view of a camera external package, according to an exemplary embodiment.

FIG. 7 is an exploded perspective view of a camera external package, according to an exemplary embodiment. The camera external package illustrated in FIG. 3 may be the camera external package 3 of FIG. 1. A front and a rear in FIG. 7 are directions according to a front view of FIG. 8.

The camera external package may include an inner cover 31, a housing 32, an outer cover 33, a bracket 34, and internal components accommodated in the inner cover 31 and the housing 32.

The inner cover 31 and the housing 32 may be coupled and assembled to accommodate the internal components. The inner cover 31 and the housing 32 may be formed in a shape shown in FIG. 7 as well as in various shapes capable of accommodating the internal components. For example, the inner cover 31 and the housing 32 may be integrated not to be distinguished from each other.

The inner cover 31 may include a plurality of holes having shapes corresponding to a junction connector 35 and a contact member 36. The inner cover 31 and the housing 32 may be coupled to allow the junction connector 35 and the contact member 36 to pass through the plurality of holes.

The outer cover 33 and the housing 32 may be coupled and assembled to accommodate the camera assembly. Preferably, but not necessarily, the housing 32 and the inner cover 31 may be coupled, the camera assembly may be coupled to electrically connect the junction connector 35 and the contact member 36 exposed through the plurality of holes of the inner cover 31 to the intermediate connector 18 and the insert 19 of the camera assembly (see FIG. 5), and then the outer cover 33 and the housing 32 may be coupled and assembled to allow the outer cover 33 to cover the camera assembly.

The outer cover 33 may include an opening 33a formed to expose a lens part of the camera assembly. The opening 33a formed at a front surface of the outer cover 33 may have a size that exposes both the lens cover 12 and the IR cover 13 of the camera assembly (see FIG. 3).

Also, a holding step that holds an outer circumference of a front surface of the camera assembly may be formed at a boundary of an open front surface of the outer cover 33 to prevent frontward deviation of the camera assembly.

Since the outer cover 33 and the housing 32 are components that protect the camera assembly from external factors, the outer cover 33 and the housing 32 may include a material strong against an external shock, a corrosion-resistant material or the like, and a waterproofing material to protect the camera assembly from water. However, the materials of the outer cover 33 and the housing 32 are not limited thereto.

Since the camera assembly is accommodated in an internal space formed by the outer cover 33 and the inner cover 31 to be waterproof and protected from an external shock when the camera assembly is coupled to the camera external package, it is possible to use the indoor camera assembly outdoors.

The bracket 34 may be coupled to a rear of the housing 32. The bracket 34 may fix the camera external package to an installation place. For this, the bracket 34 may include a screw hole 37. The camera external package may be fixed to the installation place by positioning the bracket 34 at a position at which the camera external package is to be installed and tightening a screw passing through the screw hole 37.

The bracket 34 may further include an angle adjustment joint 38 capable of adjusting an angle of the camera external package to adjust a direction in which the camera external package faces. Here, the angle of the camera external package to adjust a direction in which the camera external package faces refers to an angle of a front surface of the outer cover 33. The angle adjustment joint 38 includes a groove 38c formed to extensively change the angle of the camera external package. A function of the bracket 34 for adjusting the direction in which the camera external package faces will be described below with reference to FIGS. 9 and 10.

Figure 8:
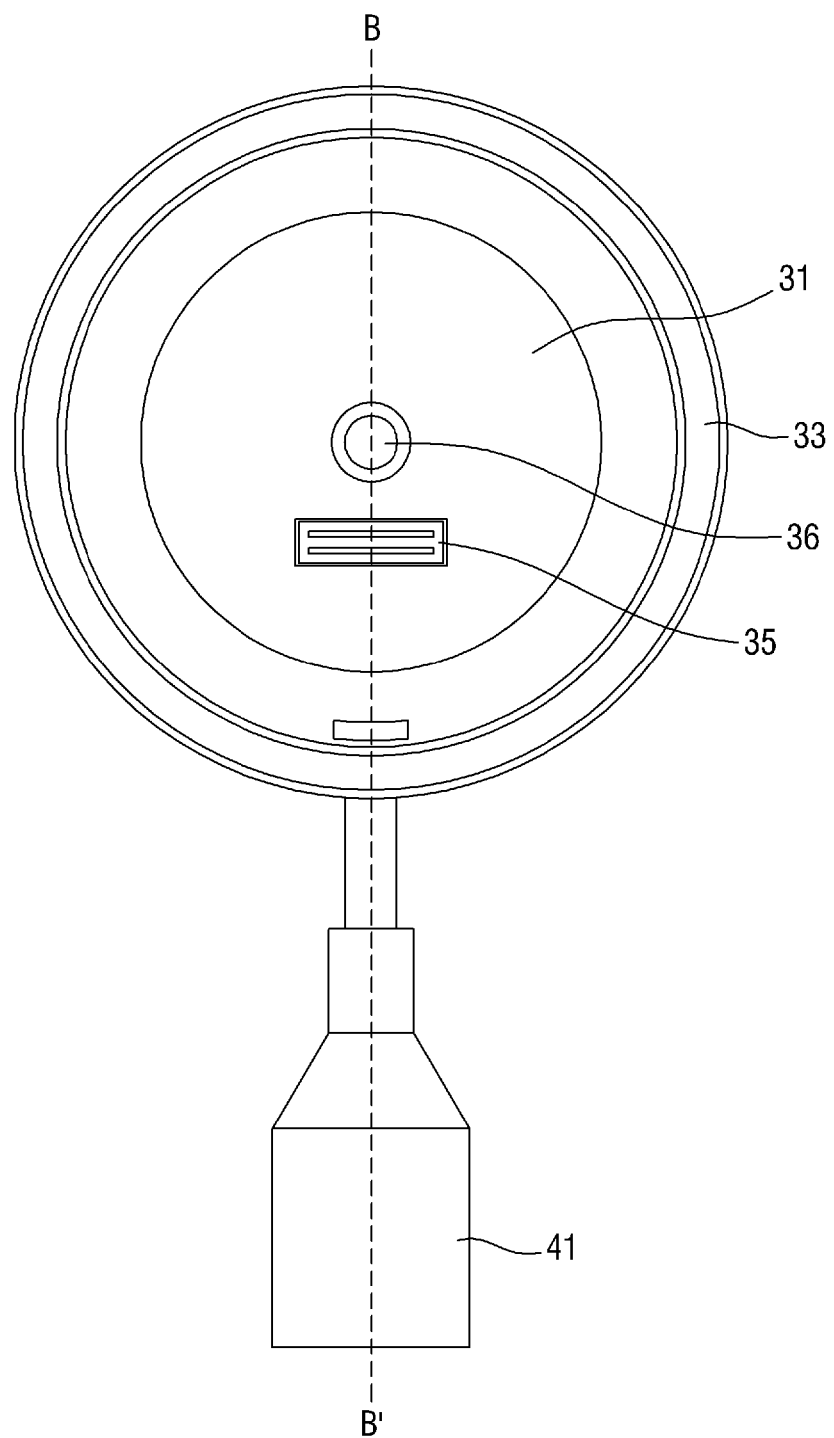
FIG. 8 is a front view of a camera external package, according to an exemplary embodiment.

FIG. 8 is a front view of a camera external package, according to an exemplary embodiment. The camera external package may be the camera external package shown in FIG. 7. FIG. 8 illustrates a state in which the camera assembly is not mounted in the camera external package, and the inner cover 31, the junction connector 35, and the contact member 36 are exposed through the opening 33a formed at the outer cover 33. The outer cover 33 of the camera external package may not include the opening 33a, according to an exemplary embodiment. The outer cover 33 may include a transparent cover to protect the lens cover 12 and the IR cover 13 of the first case 11a of the camera assembly (see FIG. 3) instead of the opening 33a.

Figure 9:
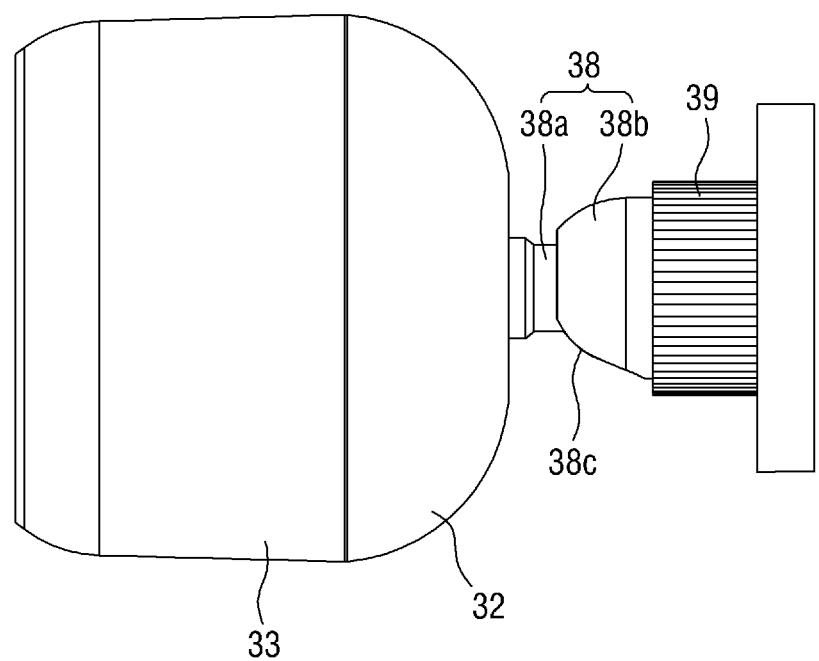
FIGS. 9 and 10 are top views of a camera external package, according to exemplary embodiments.
Figure 10:
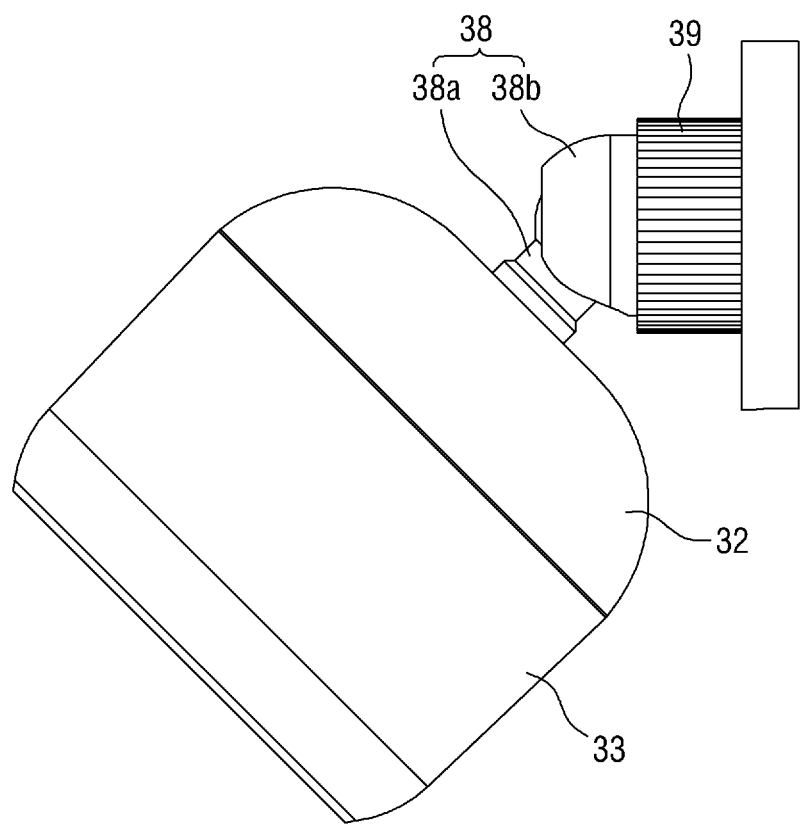

FIGS. 9 and 10 are top views of the camera external package of FIG. 8, according to an exemplary embodiment. A method of adjusting a direction which the camera external package faces by using the angle adjustment joint 38 of the bracket 34 will be described with reference to FIGS. 9 and 10.

The bracket 34 may further include the angle adjustment joint 38 and a fixing member 39 as components capable of adjusting the direction in which the camera external package faces.

The angle adjustment joint 38 may include a first joint member 38*a* and a second joint member 38*b*. The first joint member 38*a* may be rollable with respect to the second joint member 38*b*. A rolling motion refers to a motion of the first joint member 38*a* which rotates around an axis facing from the second joint member 38*b* to the first joint member 38*a* and passing through a center of the second joint member 38*b*. Also, the first joint member 38*a* may move along the groove 38*c* formed at the second joint member 38*b* such that an angle formed by the first joint member 38*a* and the second joint member 38*b* may be changed. In the camera external package shown in FIG. 10, the first joint member 38*a* moves along the groove 38*c* formed at the second joint member 38*b*, and the angle formed by the first joint member 38*a* and the second joint member 38*b* is changed.

The second joint member 38*b* may be rollable with respect to the fixing member 39. That is, the second joint member 38*b* may rotate around an axis facing from the fixing member 39 to the second joint member 38*b* and passing through a center of the fixing member 39.

The first joint member 38*a* may pivot relative to the fixing member 39 through the movement of the first joint member 38*a* relative to the second joint member 38*b* and the movement of the second joint member 38*b* relative to the fixing member 39. Since the first joint member 38*a* is coupled and fixed to a rear surface of the housing 32, it is possible to adjust the direction in which the camera external package faces relative to the fixing member 39.

Figure 11:
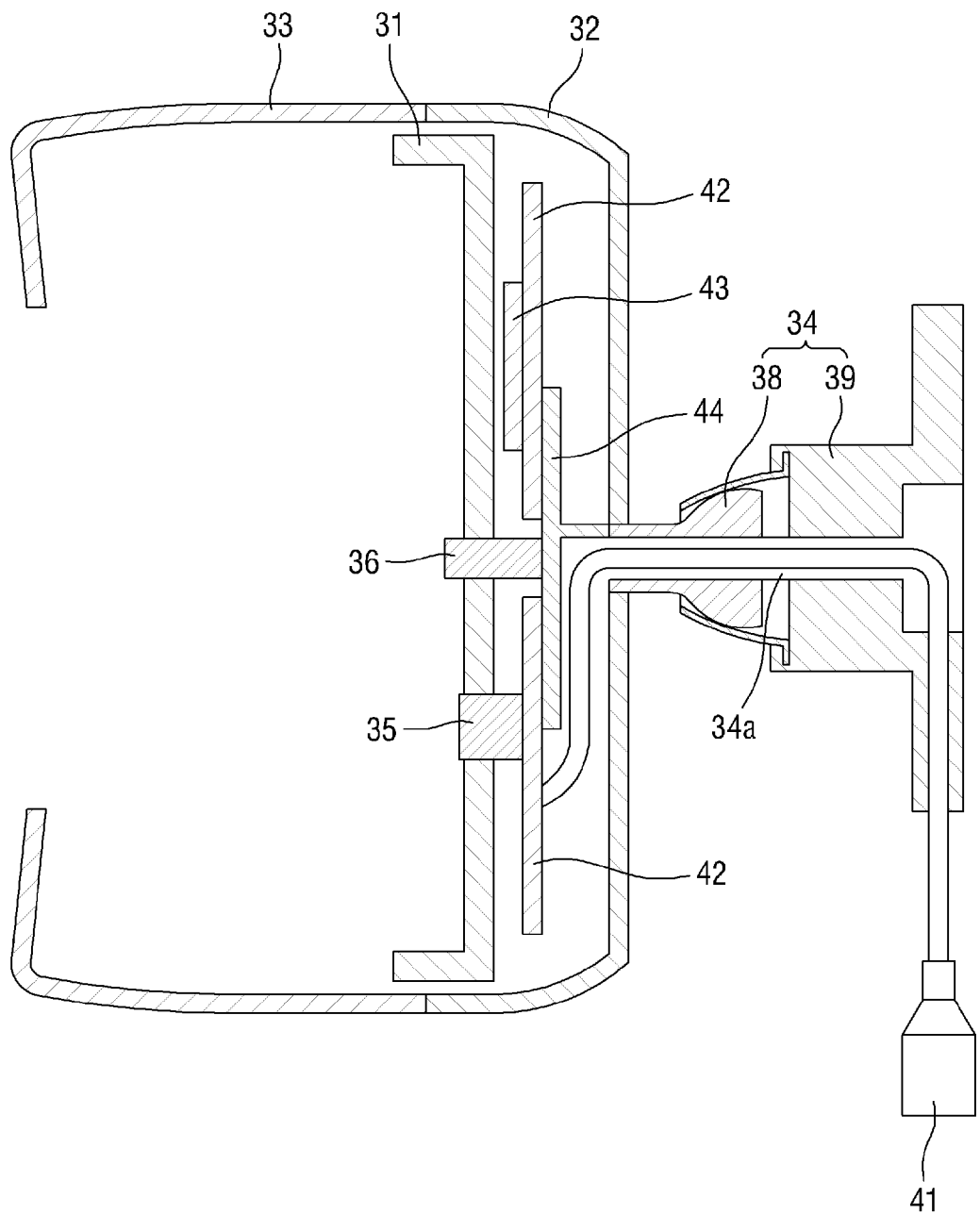
FIG. 11 is a cross-sectional view of a camera external package, according to an exemplary embodiment.

FIG. 11 is a cross-sectional view of the camera external package of FIG. 8. FIG. 11 is a cross-sectional view of the camera external package taken along a cutting line B-B' in FIG. 8.

The camera external package may include the outer cover 33, the inner cover 31, the housing 32, the bracket 34, a cable junction 41, a network board 42, the junction connector 35, a video analytics (VA) processor 43, a heat sink 44, and the contact member 36. Since the outer cover 33, the inner cover 31, the housing 32, and the bracket 34 have been described with reference to FIGS. 7 to 10, other components of the camera external package will be described hereinafter.

The cable junction 41 is a component connected to external Ethernet cables. Accordingly, power and a control signal may be transmitted to the camera external package through the external Ethernet cables or to the camera assembly through the camera external package when the camera assembly is mounted in the camera external package. Conversely, data or signals may be transmitted from the camera external package or the camera assembly connected to the camera external package to a user through the external Ethernet cables. The Ethernet cables used herein may be category 5 (CAT. 5) or higher Ethernet cables.

Ethernet cables (or LAN cables) include unshielded twisted pair (UTP) cables, shielded twisted pair (STP) cables, foiled twisted pair (FTP) cables, and the like and are classified according to a method of covering a core line in each of the Ethernet cables. Although STP cables or FTP cables have an excellent noise cutting function, UTP cables are generally used due to a low price thereof. According to some exemplary embodiments, the Ethernet cables may be STP cables, but are not limited thereto, and various types of Ethernet cables may be used thereas.

It is necessary to use CAT. 3 or higher UTP cables for PoE and CAT. 5 or higher UTP cables for PoE plus. These standards are in consideration of functions when Institute of Electrical and Electronics Engineers (IEEE) standards were established. Here, CAT refers to categories and is classified into CAT.5, CAT.5E, CAT.6, CAT.6E, CAT.7, and the like depending on bandwidth.

UTP cables include four twisted pair (TP) cables with orange, green, blue, and brown colors in which two core lines are twisted. Generally, the orange and green TP cables are used for data communication and the blue and brown TP cables are used for a telephone or spare cables to comply with standards that may be established later. To use such UTP cables, generally, all of the four TP cables, that is, eight core lines at both ends of the UTP cables, are connected to an eight-pin RJ-45 connector to be used.

The bracket 34 includes a through path 34*a* at a center thereof. The cable junction 41 may be elongated along the through path 34*a*. The through path 34*a* is also provided at a center of the angle adjustment joint 38. When the angle adjustment joint 38 moves relative to the fixing member 39, a part of the cable junction 41 which passes through the angle adjustment joint 38 naturally moves along the angle adjustment joint 38.

The network board 42 is a component necessary to transmit power and communicate data between the camera external package and the camera assembly according to an exemplary embodiment using a PoE technology specified in the IEEE 802.3af standard. The network board 42 is electrically connected to the cable junction 41 and the junction connector 35 to transmit information or power input to the cable junction 41 to the junction connector 35. The network board 42 transmits the power according to specifications of the junction connector 35. The network board 42 may be a printed circuit board (PCB).

The junction connector 35 is a connector couplably and separably connected to the intermediate connector 18 described above with reference to FIG. 5. When the camera assembly is mounted in the camera external package, the junction connector 35 is also physically and electrically connected to the intermediate connector 18 to electrically connect the camera assembly and the camera external package. Accordingly, when the camera assembly is connected to the camera external package, power may be supplied through PoE or data may be transmitted and received from the outside through the cable junction 41, the network board 42, and the junction connector 35.

The network board 42 may include the VA processor 43 which provides a VA function. The VA processor 43 may perform a VA function which intelligently analyzes image data received through the junction connector 35. The VA function includes functions of analyzing an image such as sensing a movement which occurs in the image, sensing a particular action, sensing a particular person, and the like. The VA processor 43 may extend the function of the camera assembly by providing the VA function as well as a basic camera function of the camera assembly when the camera assembly is coupled to the camera external package.

Next, the heat sink 44, which is a component that discharges heat generated in the camera assembly to the outside, will be described.

The heat sink 44 may be mounted to be in contact with the network board 42 to transfer heat generated by the network board 42. Heat transferred from the network board 42 to the heat sink 44 may be discharged to the outside along the bracket 34 in contact with the heat sink 44. The heat sink 44 and a part of the bracket 34 in contact with the heat sink 44 to discharge heat to the outside may be formed of a metal material to easily transfer heat.

The contact member 36 is a heat transfer member having a bar shape which extends from the heat sink 44, passes through a through hole of the network board 42, and may be inserted into the insert 19 (see FIG. 5) when coupled to the camera assembly. When the camera assembly is coupled to the camera external package, the contact member 36 may come into contact with the insert formed at the camera assembly, and heat generated in the camera assembly may be transferred to the contact member 36 along the insert. The heat transferred to the contact member 36 may be discharged to the outside along the heat sink 44 and the bracket 34 of the camera external package. Like the heat sink 44 of the camera external package, the contact member 36 may be formed of a metal material to easily transfer heat.

Hereinafter, a form and an operation principle in which the camera assembly and the camera external package described above are coupled to be used outdoors will be described with reference to FIG. 12.

Figure 12:
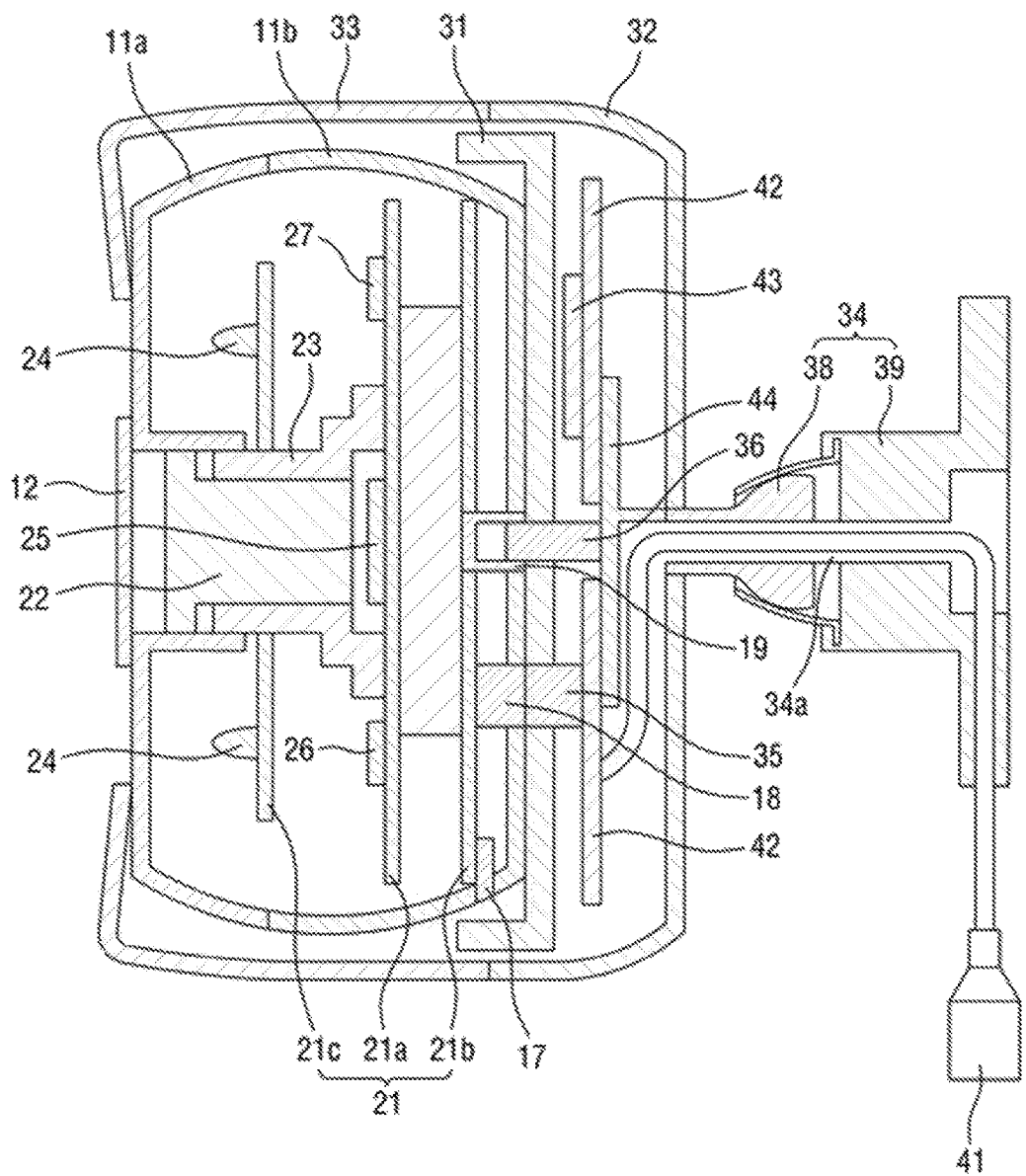
FIG. 12 is a cross-sectional view of an outdoor camera according to an exemplary embodiment.

FIG. 12 is a cross-sectional view of an outdoor camera according to an exemplary embodiment. FIG. 12 is a cross-sectional view illustrating the same plane as those of FIGS. 5 and 11 as a cross section.

Referring to FIG. 12, it may be seen that the camera assembly is accommodated in the camera external package to be coupled thereto and form the outdoor camera. As described above with reference to FIG. 1, front and rear surfaces of the camera assembly may be surrounded by the camera external package divided into two parts to be coupled to the inside of the camera external package.

As the camera assembly and the camera external package are coupled, the intermediate connector 18 of the camera assembly and the junction connector 35 of the camera external package are separably coupled. Accordingly, the intermediate connector 18 and the junction connector 35 may have corresponding shapes and may be formed at positions capable of meeting each other when the camera assembly is coupled to the camera external package.

As the intermediate connector 18 and the junction connector 35 are physically connected, the camera assembly and the camera external package are electrically connected. Since the intermediate connector 18 is electrically connected to the circuit board 21 of the camera assembly and the junction connector 35 is electrically connected to the cable junction 41 of the camera external package along the network board 42, the cable junction 41 is electrically connected to the circuit board 21 of the camera assembly.

Accordingly, power, data, a control signal, and the like may be transmitted to the camera assembly through Ethernet cables. Conversely, an image, data, a signal, and the like obtained by the camera assembly may be transmitted to a user through Ethernet cables.

In this case, since the power jack 17 is provided at a position on the camera case (the second case 11b as shown in FIG. 5) different from that of the intermediate connector 18, the power jack 17 is shielded by the inner cover 31 which surrounds the side of the camera external package. Accordingly, since contact with a DC cable is blocked, it is impossible to use the power jack 17 as a power source of the outdoor camera. When a supply of power through the power jack 17 and a supply of power through PoE are simultaneously performed, the network board 42 may require a complicated configuration for stability. However, since there are disadvantages in that manufacturing costs are increased and a size of the camera external package is increased due to the complicated structure, the power jack 17 is mechanically blocked not to perform the supply of power supply at the same time as the supply of power through the PoE.

Although the network portion 27 may also continuously use a wireless network module, when the outdoor camera is located outdoors, a communication speed is decreased by an obstacle due to a distance from a router such that a connection failure, and a decrease in resolution of a camera image may occur. Accordingly, power may be supplied through Ethernet cables and a control signal may be received from a user by using a wired network module such as an Ethernet card and the like at the same time, and image data obtained by the image sensor 25 may be transmitted to the user. In this case, since communication is performed through the Ethernet cables, the above-described limitations do not occur, and communication may be stably performed even over a long range. Accordingly, when Ethernet cables are connected to the outdoor camera to be installed a long distance away, it is preferable, but not necessary, for the use of the wireless network module and the use of the wired network module to stop. However, even though the Ethernet cables are connected to the outdoor camera, it is possible to still use the wired network module which is selectable by a user.

In conclusion, the camera assembly which receives power through the power jack 17 and communicates with a user through the wired network module may be physically and electrically connected to the camera external package by coupling the intermediate connector 18 and the junction connector 35 to receive power and communicate through Ethernet cables by using a PoE method. Here, the power jack 17 is blocked by the inner cover 31 and the power board 21b receives power from the intermediate connector 18. Also, although it is possible to continuously communicate by using the wireless network module, when a user determines that the use of the wireless network module is to stop, the camera assembly communicates with the user through the intermediate connector 18 through the wired network module. Through this, the outdoor camera which performs a function identical to that of a general outdoor camera may be configured by coupling the camera assembly and the camera external package and connecting Ethernet cables thereto.

The user may selectively determine whether the outdoor camera communicates by continuously using the wireless network module or the wired network module. Although a method thereof may be determined using a switch provided at the camera external package, the method is not limited thereto, and the method may be determined by software for controlling the outdoor camera.

The camera assembly and the camera external package are coupled to allow the contact member 36 of the camera external package to be inserted into the insert 19 of the camera assembly. When the camera assembly is coupled to the camera external package, the contact member 36 may come into contact with the insert 19 formed at the camera assembly, and heat generated in the camera assembly may be transferred to the contact member 36 along the heat sink 28 and the insert 19 of the camera assembly. The heat transferred to the contact member 36 may be discharged to the outside along the heat sink 44 and the bracket 34 of the camera external package.

In the outdoor camera shown in FIG. 12, the network portion 27 is mounted in the camera assembly, and the VA processor 43 is mounted in the camera external package. Unlike the configuration of the outdoor camera according to the above exemplary embodiment, the VA processor 43 may be mounted in the camera assembly and the network portion 27 may be mounted in the camera external package. That is, when the outdoor camera may be configured using the camera external package which adds the PoE function to the indoor camera assembly, positions, sizes, and the like of other components of the camera assembly and the camera external package may be modified according to a design thereof.

Figure 13:
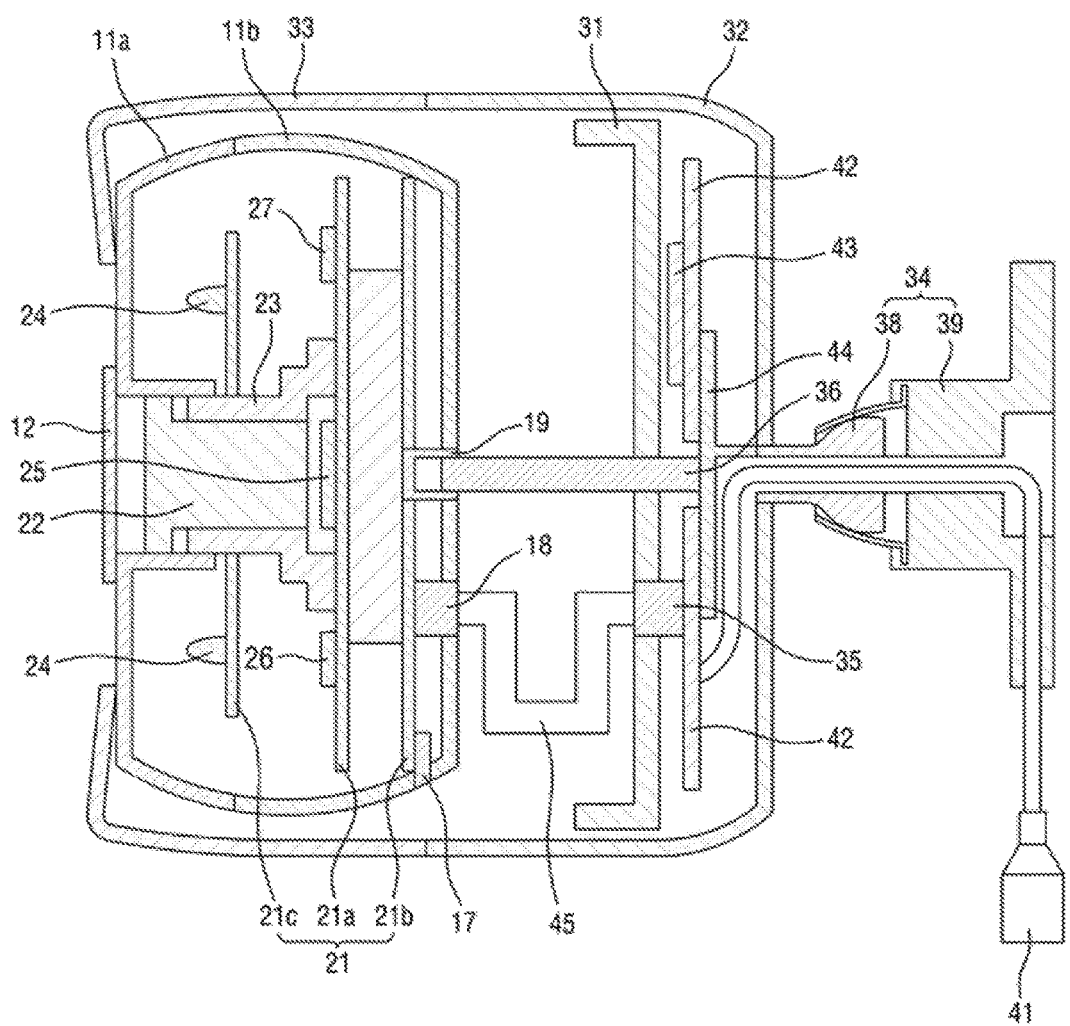
FIG. 13 is a cross-sectional view of an outdoor camera according to another exemplary embodiment.

FIG. 13 is a cross-sectional view of an outdoor camera according to another exemplary embodiment.

Referring to FIG. 13, it may be seen that the outdoor camera according to this exemplary embodiment basically includes most of the same components as those according to the exemplary embodiment shown in FIG. 12, but the intermediate connector 18 and the junction connector 35 are connected through a cable 45. Since it is necessary to perform fastening between devices and fastening connectors at the same time during a manufacturing process when the intermediate connector 18 and the junction connector 35 are configured to be directly connected, a difficulty in manufacturing may occur when trying to simultaneously satisfy two conditions thereof.

Accordingly, in the outdoor camera according to this exemplary embodiment, the intermediate connector 18 and the junction connector 35 are not directly physically coupled and indirectly electrically connected through the cable 45. Accordingly, the cable 45 is configured such that one end thereof is connected to the intermediate connector 18 and the other end is connected to the junction connector 35. The one end and the other end of the cable 45 may be separably connected to the intermediate connector 18 and the junction connector 35, and may be provided as separate components from the camera assembly and the camera external package. However, exemplary embodiments are not limited thereto, and the camera assembly and the camera external package may be electrically connected by fixedly coupling the one end of the cable 45 to the intermediate connector 18 of the camera assembly and connecting only the junction connector 35 to the other end of the cable 45. Otherwise, conversely, the camera assembly and the camera external package may be electrically connected by fixedly coupling the other end of the cable 45 to the junction connector 35 and connecting only the intermediate connector 18 to the one end of the cable 45.

As described above, when the intermediate connector 18 and the junction connector 35 are indirectly connected through the cable 45, it is only necessary to precisely match a shape through which the camera assembly is coupled to and supported by the camera external package. Since the intermediate connector 18 and the junction connector 35 are connected through the cable 45 even when not formed at corresponding positions, a manufacturing process thereof is shortened and manufacturing difficulties are reduced.

Figure 14:
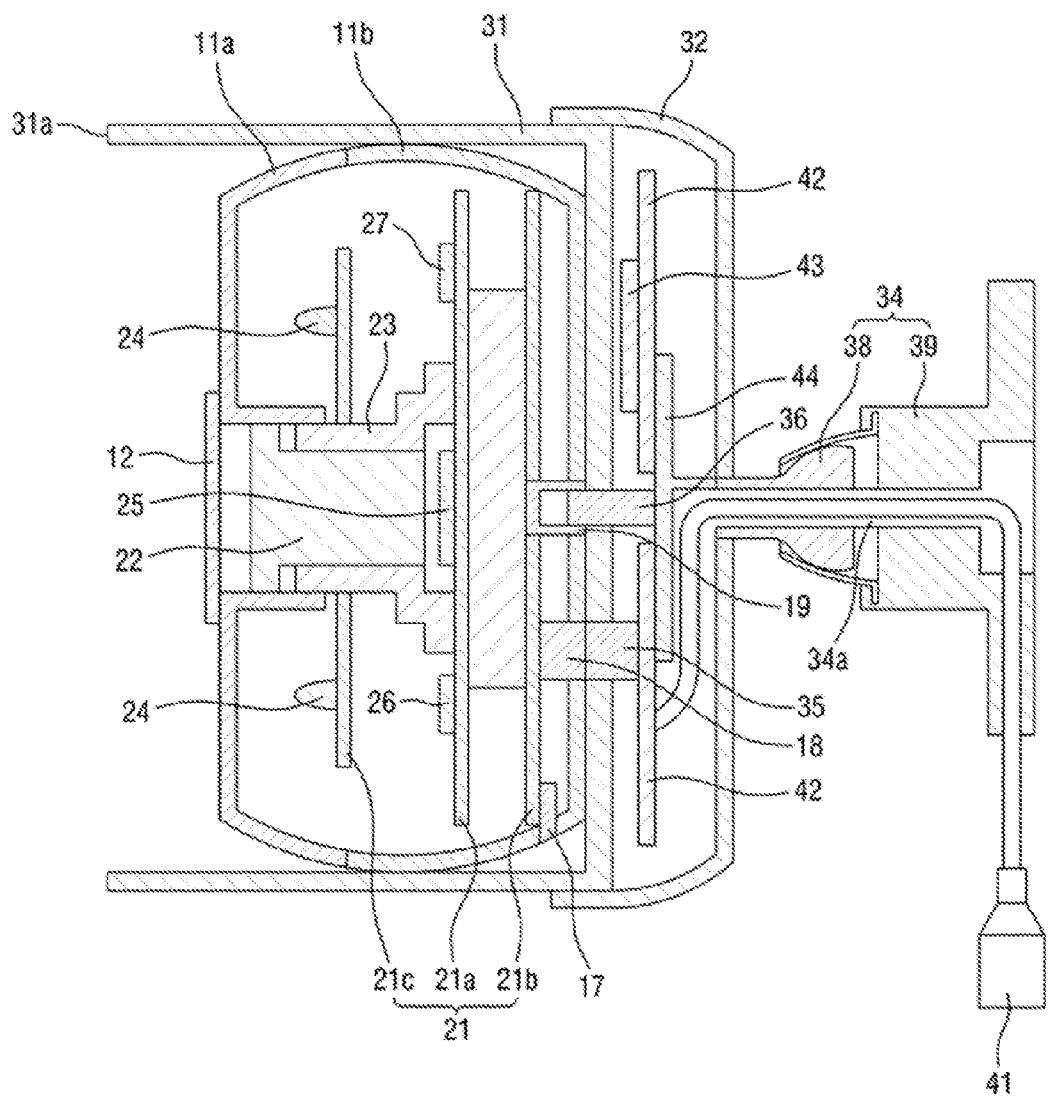
FIG. 14 is a cross-sectional view of an outdoor camera according to still another exemplary embodiment.

FIG. 14 is a cross-sectional view of an outdoor camera according to still another exemplary embodiment. Referring to FIG. 14, when compared to the configuration according to the exemplary embodiment shown in FIG. 12, the outdoor camera according to this exemplary embodiment does not include the outer cover 33, and a side of the inner cover 31 is extended from an edge 31a.

In the exemplary embedment of FIG. 12, the holding step that holds the outer circumference of the front surface of the camera assembly is formed at the boundary of the open front surface of the outer cover 33 to prevent frontward deviation of the camera assembly. However, when the camera assembly is fixed to the camera external package only by coupling between the intermediate connector 18 and the junction connector 35 and coupling between the insert 19 and the contact member 36, the holding step of the outer cover 33 may lose such a function. Accordingly, in this exemplary embodiment of FIG. 14, the configuration is modified to remove the outer cover 33 and extend the inner cover 31 frontward from edge 31a.

In the outdoor camera according to this exemplary embodiment, the camera assembly is accommodated in a space formed by extending the side of the inner cover 31. Accordingly, to protect the camera assembly from external factors, the side of the inner cover 31 may be extended to allow the inner cover 31 to protrude more frontward than the camera assembly. Also, the camera assembly and the camera external package may be coupled to allow an outer circumferential surface of the camera assembly to come into contact with an inner circumferential surface of the inner cover 31 to waterproof the camera assembly.

Although the camera assembly is accommodated by extending the inner cover 31 in this exemplary embodiment described with reference to FIG. 14, the camera assembly may also be accommodated by using another method different therefrom. As such another method, the camera assembly may be accommodated in a space formed by extending the housing 32 by using the same method as that of extending the inner cover 31. In this case, the camera assembly and the camera external package may be coupled to allow an inner circumferential surface of the housing 32 to come into contact with the outer circumferential surface of the camera assembly to waterproof the camera assembly. Otherwise, the camera assembly and the camera external package may be coupled to allow the outer circumferential surface of the camera assembly to come into contact with the un-extended inner circumferential surface of the inner cover 31.

According to the above exemplary embodiments, at least the following effects may be provided.

A single camera assembly is usable indoors and outdoors with only a camera external package without separately preparing an indoor camera and an outdoor camera.

Since components necessary for using an indoor camera assembly outdoors are provided in a camera external package, an outdoor camera may be configured to maintain a small size of the camera assembly.

Power supply and data transmission/reception may be stably performed outdoors without great restrictions by coupling the camera assembly and the camera external package. Also, a VA function may be added to a basic function of the camera assembly.

Effects are not limited to the above description, and a larger variety of effects are included in the specification.

It should be understood by one of ordinary skill in the art that the above exemplary embodiments can be modified in other detailed forms without changing the technical concept and essential features of the inventive concept. Therefore, the above exemplary embodiments should be understood as being exemplary and not limiting in every aspect. The scope of the inventive concept will be defined by the following claims rather than the above detailed description, and all changes and modifications derived from the meaning and the scope of the claims and equivalents thereof should be understood as being included in the scope of the inventive concept.

What is claimed is:

1. A camera external package configured to be coupled to and separated from a camera assembly and to provide an extension of functions of the camera assembly when coupled to the camera assembly, the camera external package comprising:

a cable junction to which a cable extended from the outside is connectable;

a network board electrically connected to the cable junction, and configured to receive power and transmit and receive data to and from the outside through the cable junction;

a housing configured to include the network board;

a junction connector electrically connected to the network board and coupled to an intermediate connector formed at the camera assembly to supply the power to the camera assembly and transmit and receive the data to and from the camera assembly when the camera assembly and the camera external package are coupled;

a heat sink configured to come into contact with the network board to discharge heat generated by the network board to the outside; and a contact member configured to come into contact with an insert formed at one side of the camera assembly and to transfer heat generated by the camera assembly to the outside when the camera assembly and the camera external package are coupled.

2. The camera external package of claim 1, wherein the network board is a circuit board configured to support power over Ethernet (PoE) and performs the supply of the power and the transmitting and receiving of the data through the PoE.

3. The camera external package of claim 1, wherein the contact member has a bar shape, is extended from the heat sink, and passes through a through hole formed in the network board to protrude forward.

4. The camera external package of claim 3, further comprising a bracket configured to come into contact with the heat sink to discharge heat of the heat sink to the outside and to fix the camera external package to an installation place.

5. The camera external package of claim 4, wherein the bracket comprises a through path formed at a center thereof such that the cable junction is extended to the outside through the through path.

6. The camera external package of claim 5, wherein the bracket further comprises an angle adjustment joint configured to adjust an angle of the camera external package to adjust a direction which the camera external package faces, and at least a part of the through path is provided in the angle adjustment joint.

7. The camera external package of claim 1, further comprising an inner cover attachable to and detachable from a rear of the camera assembly, and configured to accommodate the network board and expose the junction connector and the contact member to the outside.

8. The camera external package of claim 7, wherein a side of the inner cover is extended frontward to surround a side of the camera assembly to protect the camera assembly from external factors.

9. The camera external package of claim 7, further comprising an outer cover coupled to the housing to form an accommodation space that accommodates the camera assembly with the inner cover, wherein the outer cover comprises an opening that exposes a lens part of the camera assembly frontward.

10. The camera external package of claim 1, wherein the network board comprises a video analytics (VA) processor configured to provide a VA function that extends functions of the camera assembly, and extensively provide the VA function in addition to a basic camera function of the camera assembly when the camera assembly and the camera external package are coupled.

* * * * *